United States Patent [19]
Ogiso et al.

[11] 3,837,736
[45] Sept. 24, 1974

[54] CAMERA AND MICROPHONE COMBINATION HAVING A VARIABLE DIRECTIONAL CHARACTERISTIC IN ACCORDANCE WITH A ZOOM LENS CONTROL

[75] Inventors: Mitsutoshi Ogiso, Kawasaki; Kazuya Hosoe; Kiyoshi Takahashi, both of Tokyo; Takashi Itani, Tokyo, all of Japan

[73] Assignee: Canon Kabushiki Kaisha, Tokyo, Japan

[22] Filed: Aug. 29, 1973

[21] Appl. No.: 392,427

[30] Foreign Application Priority Data
Aug. 29, 1972 Japan .......................... 47/86498

[52] U.S. Cl. ....................... 352/12, 352/1, 352/5, 352/25, 352/140
[51] Int. Cl. ................................. G03b 31/00
[58] Field of Search ......... 325/1, 5, 12, 25, 31, 139, 325/140

[56] References Cited
UNITED STATES PATENTS

| | | | |
|---|---|---|---|
| 1,777,828 | 10/1930 | Deforest | 352/5 |
| 1,939,074 | 12/1933 | Maxfield | 352/5 |
| 2,783,677 | 3/1957 | Becker | 352/5 |

*Primary Examiner*—Monroe H. Hayes
*Attorney, Agent, or Firm*—McGlew and Tuttle

[57] ABSTRACT

A simultaneous picture and sound recording system provides variation of the directional characteristic of a sound-receiving microphone in accordance with the zoom lens adjustment of a motion picture camera. The motion picture camera having a zoom lens is provided with a potentiometer which is interlocked with a zoom control ring capable, upon rotation, of moving the zoom lens assembly along the optical axis to derive a difference signal which is fed to an electric circuit device incorporated in the system. The electric circuit device is connected to a microphone having a variable directional characteristic so that the output signal from the device is directed to the input of the microphone. The combination makes it possible to increase the directional response characteristic of the microphone in the main direction, while adjusting the focal length of the motion picture camera from the wide angle setting to the telephoto setting.

10 Claims, 8 Drawing Figures

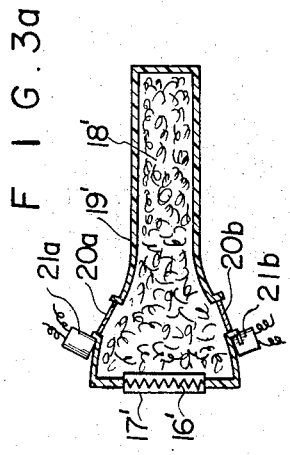
FIG. 3a
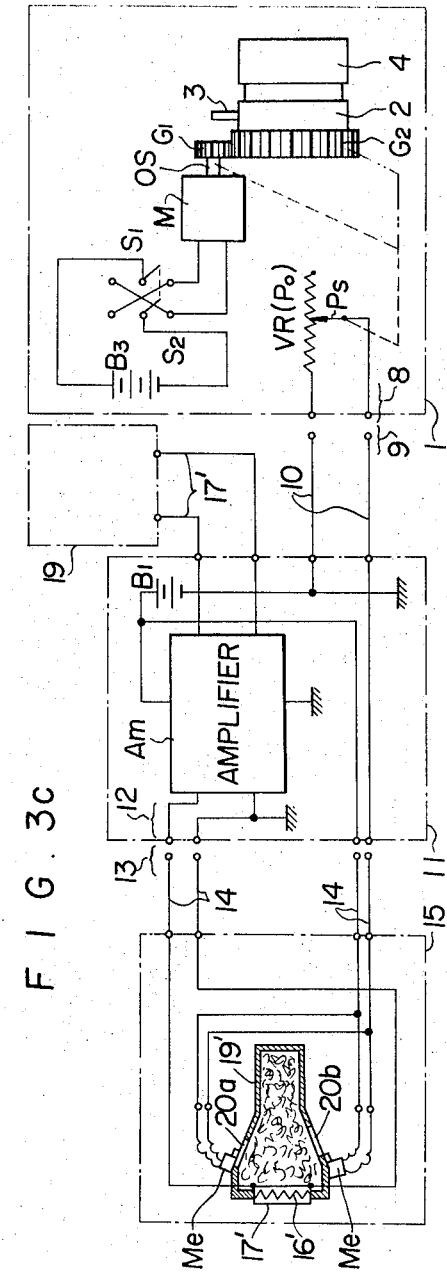
FIG. 3b
FIG. 3c

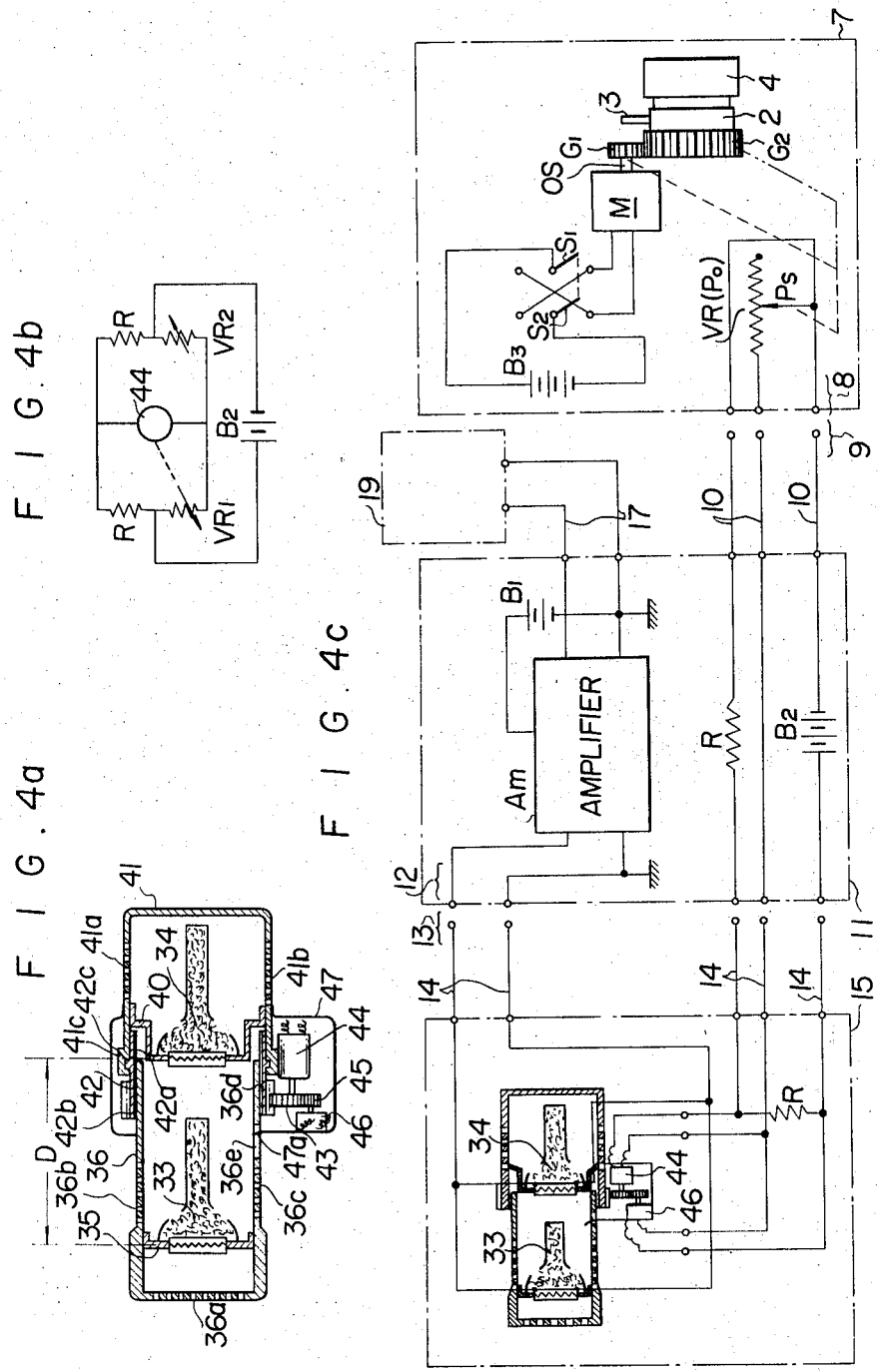

CAMERA AND MICROPHONE COMBINATION HAVING A VARIABLE DIRECTIONAL CHARACTERISTIC IN ACCORDANCE WITH A ZOOM LENS CONTROL

BACKGROUND OF THE INVENTION

1. Field of the Invention

This invention relates generally to the field of amateur cinematography of the type in which a motion picture camera having a zoom lens is operated while sound is simultaneously recorded through a microphone, and more particularly to a system which provides variation of the directional characteristics of a microphone or microphone arrangement in accordance with the zoom lens control of the camera.

2. Description of the Prior Art

Varifocal lenses, or so-called zoom lenses, have found wide use for some years in motion picture cameras, and permit of a high standard of technique of photography with remarkable photographic results effected by the zooming. With advancement of the photographic technique, the simultaneous picture and sound recording system, in which the motion picture camera may be operated simultaneously with the recording of sound incident from an object being photographed, is under development. This synchronous sound reproduction permits the photographed object to appear with more truthfulness to the viewer and listener when projecting the film.

In order to change the directional characteristic of a microphone element, many solutions have been proposed. However, most of them employ a construction affording stepwise changes among several directional characteristics such as omnidirectional, unidirectional, etc, but no interlocking mechanism which permits a stepless variation of the directional characteristics has been known yet.

SUMMARY OF THE INVENTION

An object of the present invention is to provide a system which provides a variation of the sound-responsive directional pattern in accordance with the variation of angular field of a motion picture camera having a zoom lens while adjusting the zoom lens from one end position to the other during a shot, so that the motion picture sound photography described above affords more realistic or verisimilar reproduction of the photographed scenes.

The feature of the present invention resides in that the directional characteristics, such as omnidirectional, unidirectional and bidirectional characteristics of microphone is steplessly varied by the use of a simple electric and mechanical elements interlocked with the zoom control element of the motion picture camera.

Other objects and advantages of the present invention will become apparent during the course of the following description taken in conjunction with the accompanying drawings.

BRIEF DESCRIPTION OF DRAWINGS

FIG. 3 illustrates a further embodiment of the system shown in FIG. 1 which is adapted to control the directional characteristic of a ribbon microphone in accordance with the zoom lens control, with FIG. 3a being a sectional view of the ribbon microphone, FIG. 3b a perspective view of a velocity component adding unit applicable with the ribbon microphone, and FIG. 3c an electrical circuit diagram illustrated as including the interconnection of the ribbon microphone to the camera lens control element.

FIG. 4 illustrates a still further embodiment of the system shown in FIG. 1 which is adapted to control the directional characteristic of a secondary order pressure gradient microphone in accordance with the zoom lens control, with FIG. 4a being a sectional view of the microphone arrangement, FIG. 4b a drive motor circuit diagram, and FIG. 4c an electrical circuit diagram illustrated as including the interconnection of the microphone to the zoom lens control element.

DESCRIPTION OF THE PREFERRED EMBODIMENTS

Figure 1:
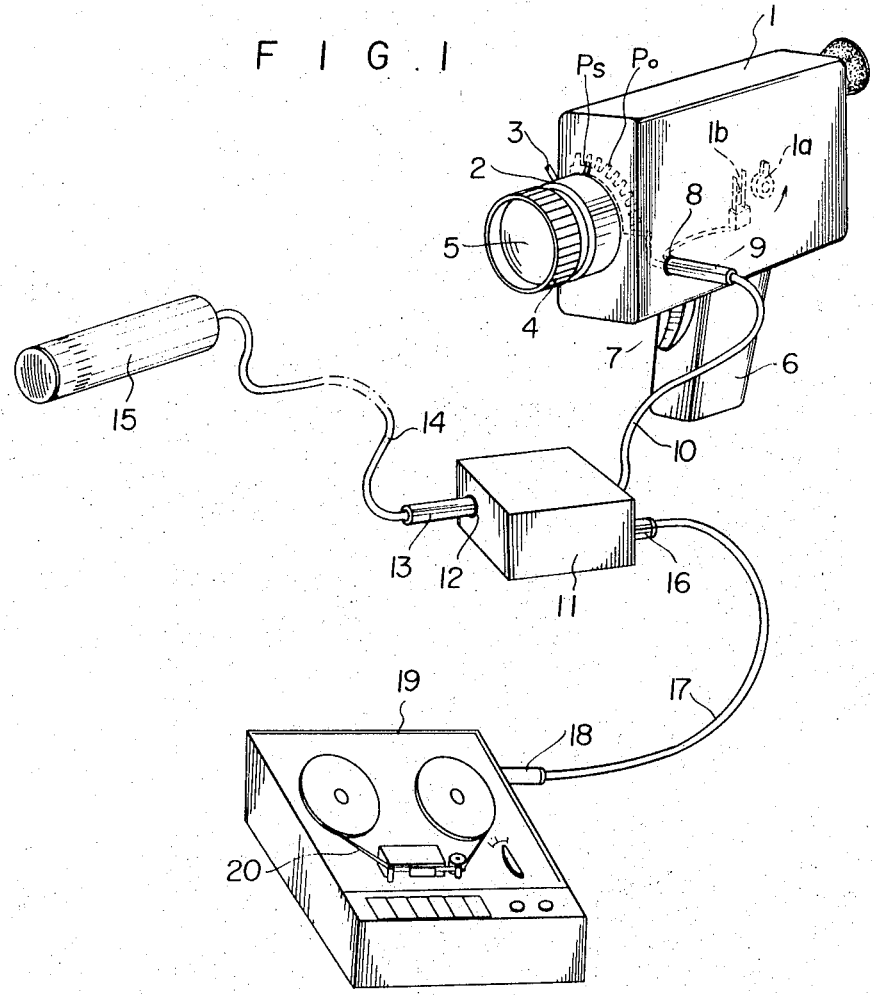
FIG. 1 is a perspective view of one embodiment of the combination of a photographic camera element, microphone element, recording element and a control element for controlling these elements which are adapted for use in a practical system of the present invention.

The motion picture camera 1 of FIG. 1 has an electrical and mechanical construction such as usually required for carrying out sound recording in synchronism with picture recording. For example, a switching device 1a, 1b, for generating a pulse signal in synchronism with the film drive as shown in the figure, is mounted within the camera body. The zoom lens control ring 2 is provided with a zoom operable lever 3 and a potentiometer Po mounted therein to detect the position of the zoom lens adjustment, so that when the zoom lens control ring 2 is rotated, a slidable tap Ps is moved to derive different signal. The camera is further provided with a focus adjusting ring 4 holding a focal length adjusting optical system 5, a grip 6 and a release button 7, each being of known construction. The output of the potentiometer Po for detecting the adjustment of the zoom lens ring 2 is directed to a control element 11 through a connector jack 8 mounted in the side wall of a camera, a connector plug 9 and an interconnecting cable 10. Of course, the connectors 8, 9 and cable 10 are formed to transmit not only such output signal but also a synchronous pulse signal necessary for the simultaneous sound recording from the switch section 1b of the camera. The electrical circuit device 11 includes not only the usual members such as amplifiers, synchronous circuit, etc but also circuit portions for generating the zoom control ring adjustment signal and a control signal for controlling the directional characteristic of the sound receiving microphone to be described. The electrical circuit device 11 is associated with a connector jack 12 coupled with a connector plug of a cable 14 terminating in a microphone 15, so that the sound input signal of the microphone, and the signal for controlling the directional characteristics are, transmitted therethrough. The construction of the condenser microphone 15 is important for the invention, and it will be discussed in greater detail herebelow with reference to the drawings. But it will be appreciated that the present invention consists of a combination of a camera adapted to generate a zoom lens ring adjustment signal, a circuit for simultaneously sound recording, and an electrical circuit device provided with a circuit portion for varying the directional characteristic of a condenser microphone constructed to have a variable directional characteristic. Therefore, the means for varying the directional characteristic of a microphone and the microphone itself are not limited to a particular type.

The electrical circuit device 11 is further provided with a connector plug 16 which, when connected through a cable 17 and connector plug 18 to a tape recorder 19, permits sound to be recorded on a tape 20 in synchronism with the picture recording. In this arrangement, the running speed of the sound recording tape 20 and the feeding speed of a photographic film in the camera 1 are coordinated, and the sounds from the condenser microphone 15 are recorded on the sound recording tape, through electrical circuit device 11.

Figure 2:
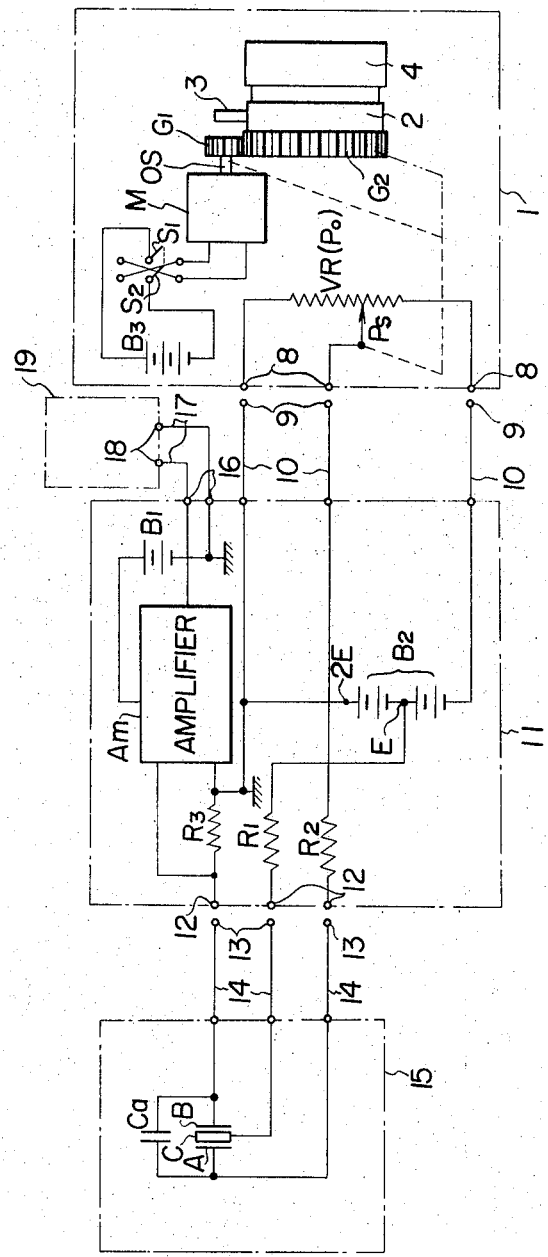
FIG. 2 is an electrical circuit diagram of one embodiment of the system shown in FIG. 1 which is adapted to control the directional characteristic of a condenser microphone in accordance with the zoom lens control.

FIG. 2 is an electrical circuit diagram, including a partial elevational view, of one embodiment of the practical system illustrated in FIG. 1. In the figure, a block 15 enclosed with dash dot lines indicates a condenser microphone circuit having a sound-receiving section composed of a back vibrating plate A, a stationary electrode C, a front vibrating plate B and a capacitor Ca connected in parallel therewith. The stationary electrode C is connected to a middle tap E of a microphone battery B2 through the terminals 13, 12 of cable 14 and resistor $R_1$ of the electrical circuit device, so that a potential +E volts is applied to the electrode C. The back vibrating plate A is connected through the cable 14, terminals 13, 12, a resistor R2 of the electrical circuit device 11, the cable 10 and terminals 8, 9 to a slidable tap Ps of a potentiometer VR for detecting the position of zoom control ring adjustment. The front vibrating plate B is connected through the cable 14, the terminals 12, 13 and a resistor $R_3$ of the electrical circuit device to the input of an amplifier A $m$, such as a field effect transistor connected to a battery $B_1$. The electrical circuit device is usually mounted within the microphone, because of the high impedance of the sound-receiving member of the condenser microphone 15, but, for convenience, it is illustrated as being separated therefrom.

Mounted in the camera body 1 is the potentiometer Po of which the slidable tap Ps is directly or indirectly interlocked with a zoom control ring 2. In the case of a motor driven zoom mechanism, the zoom control ring 2 is mounted on a gear G2 engaging with a gear G1 mounted on a shaft OS of a drive motor M. Therefore, the zoom control ring 2 may be interlocked with the shaft OS of the motor, arranged to be connected to a battery $B_3$ through switches S1 and S2, so that, when the motor is driven to adjust the focal length of the zoom lens, for example, from the wide angle position to the telephoto position, or vice versa, along the optical axis, the rotation direction of the motor can be changed over by the switches.

Also connected to electrical circuit device 11 is tape recorder 19 as shown in the figure. The electrical circuit diagram of FIG. 2 is illustrated as being particularly adapted to vary the directional characteristic of the microphone 15. The other circuit portions for synchronous sound recording may be of a conventional type, and therefore their illustrations are omitted.

In the above-described circuit, when the position of the slidable tap Ps on the resistor VR of the potentiometer Po is varied by the rotation of the zoom control ring, the voltage between the back vibrating plate A and the stationary electrode C is varied from + E volt to − E volt, while the voltage between the front vibrating plate B and stationary electrode C is maintained constant at +E volt because the voltage applied between the opposite terminals of the potentiometer VR is 2E volt.

Therefore, the microphone functions as follows:
1. When the voltage applied between A and C is + E volt, the bidirectional characteristic is obtained because the output phase is opposite to that of B–C side.
2. When the voltage applied between A and C is zero volt, a unidirectional characteristic is obtained because the A–C side is made inoperative.
3. When the voltage between A and C is − E volt, and omnidirectional characteristic is obtained because the phase is the same as that of the B–C side.

Therefore, if the zoom control ring is interlocked with the potentiometer in such a relationship that, when the zoom control lens is adjusted from the wide angle setting to telephoto setting, the voltage between A and C is increased form − E volt to zero volt, the resultant directional characteristic of the microphone is omnidirectional at the wide angle setting and unidirectional at the telephoto setting.

Of course, it is possible to set the potentiometer so that a bidirectional characteristic is obtained at the telephoto setting.

FIG. 3 illustrates an embodiment of the system for varying the directional characteristics of a ribbon microphone of the known type. As is well known, a ribbon microphone has a ribbon 16' supported in a yoke 17', in the rear of which a sound-absorbing material 18 such as cotton is placed. Numeral 19' is a casing for holding these members. The directional characteristic of such a microphone can be varied by varying the area of the opening of the small holes 20a, 20b provided on the casing through which the velocity component passes. In order to achieve this purpose, there are provided units 21a, 21b, such as meters or motors, arranged to be brought in engagement with their respective iris diaphragms of which the opening areas are varied by varying the current flowing through the meters or motors. FIG. 3b is a fragmentary perspective view illustrating the construction of such a unit. A fixed ring 22 having a slot 22' on the periphery is provided with a rotatable ring 23 slidably mounted therein so that when the rotatable ring 23 is rotated, the diaphragm blades 24 are opened or closed. The rotatable ring 23 has a pin 25 rigidly mounted thereon to control the rotation from the outside. The pins 25 projects through the slot 22' of the fixed ring 22. A meter 26 is positioned adjacent to the ring 22 to bring the needle mounted on the rotatable shaft 29 of the meter into engagement with the pin 25 as shown in FIG. 3b, so that a rotation of the rotor of the meter 26 causes the pin 22 to move, rotating the ring 23, thereby to control the area of the opening of the diaphragm blades 24. Numeral 30 indicates a pair of input terminals.

As shown in FIG. 3c, the meters M$e$ are connected, in parallel with each other in series with the potentiometer VR for detecting the zoom ring adjustment, so that the current flowing through the meters is controlled by the zoom lens adjustment to vary the area of the opening of the diaphragm blades.

In order rigidly to secure the above-described unit on a ribbon microphone, the unit is mounted on a board 31 having small holes 32. In the above-described construction, it is possible to adjust the area of the opening of the small holes through which the velocity component of the ribbon microphone may pass on. Therefore, it is apparent that the directional characteristic is varied in accordance with the area adjustment.

In order to vary the directional characteristic of a microphone from omnidirectional to unidirectional, the zoom control ring is interlocked with the potentiometer in such a relationship that when the zoom lens is adjusted from the wide angle setting to the telephoto setting, the opening area of the holes 20a, 20b through which the velocity component passes on is increased from zero to the maximum by means of the meters M$e$ driven in accordance with the variation in resistance value VR of the potentiometer. Of course, it is possible to vary the directional characteristic of a microphone from unidirectional to omnidirectional, while zooming reversely from the telephoto setting to the wide angle setting.

In the case of an electro-dynamic microphone, a unit having a variable aperture mechanism with the performance similar to the above may be mounted on the back side of the microphone, and the opening area of the aperture is varied to effect variation in the directional characteristic.

FIG. 4 illustrates one example of a practical secondary order pressure gradient microphone constructed according to the invention by arranging two cardioid unidirectional microphones adjacent to each other in series and connecting them in phase opposition, and its electrical circuit diagram, in order to obtain a more acute directional characteristic than the directional characteristic, that is, the unidirectional characteristic having a cardioid directional pattern, obtained by the construction shown in FIG. 3. In this microphone arrangement, sound incident in the lateral direction of the microphone combination enters the two microphones simultaneously, so that when the output is combined in phase opposition, the outputs are neutralized, being reduced to zero. Sound incident from the front in the longitudinal direction, causes a sound pressure based on the delay, proportional to the distance between the two microphones, to be applied on the rear microphone, thereby deriving an output. Sound incident from the back derives no output because the directional characteristic of the microphone is cardioidal. Thus, a microphone arrangement having an acute sensitivity to sound incident from the front is obtained. FIG. 4a illustrates an arrangement of ribbon microphones 33, 34 having a cardioid directional characteristic. The microphones are not necessarily limited to the ribbon type, and any microphones may be applied provided that they have cardioid unidirectional characteristics. A microphone 33 is fixed in a casing 36 by means of a support member 35. The casing 36 has a number of sound permeable holes at 36a, 36b and 36c, and a screw-threaded portion on its one end. Another microphone 34 is fixed in another casing 41 by means of a support member 40, and the casing 41 has a number of holes 41a, 41b similar to those of the casing 36, and one end 41c of the casing is engaged with an adjusting ring 42 having an internally screw-threaded portion 42a, a gear 42b on its external wall and a projecting portion 42c engaging rotatably with the casing 41. Therefore, upon rotation of the adjusting ring 42, the front casing 36 is moved forwardly or rearwardly relative to the rear casing 41, so that the relative distance between the front microphone 33 and the rear microphone is varied. On the other hand, the adjusting ring 42 is driven by a drive motor 44 having a gear 43 mounted on its shaft, and simultaneously the slidable tap of the potentiometer, having a gear 45, is rotated in order to detect the adjustment of the adjusting ring 42. This mechanism is mounted in a casing 47. A projection 47a from the casing 47 is slidably engaged with a longitudinal slot 36e to prevent rotation of the casing 36 relative to the casing 41. In order to effect the adjustment of the relative distance, the resistor VR$_1$, of the potentiometer 46 interlocking with motor 44, and the resistor VR, of the potentiometer for detecting the zoom control ring adjustment, are bridged along with resistors R as shown in FIG. 4b, so that the motor 44 is driven to rotate in either direction from a battery source B$_2$ in accordance with the difference between the outputs of VR$_1$ and VR. Provided that the initial interlocking relationship between the potentiometers VR and VR$_1$ is properly established, the operation of the zoom control ring causes the adjusting ring 42 to rotate until the relative distance between two microphones 33 and 34 reaches a predetermined value, while varying the directional characteristic of the secondary order pressure gradient microphone composed of the two microphones.

FIG. 4c is an electrical circuit diagram of one embodiment of the system which is adapted for use with the arrangement of the two microphones and their operating circuits shown in FIG. 4a and 4b, so that the directional characteristics is varied in accordance with the zooming operation of a motion picture camera. It will be understood that the circuit of FIG. 4c is illustrated in more detailed form than in FIG. 4b, as comprising the elements and the blocks corresponding to the respective elements of the system shown in FIG. 1. In the figure, the parts corresponding to those shown in FIG. 3c are indicated with like reference characters to simplify the description.

Consideration will now be given to how the relative distance between two ribbon microphones 33, 34, constituting a secondary order pressure gradient microphone, is adjusted by means of a drive motor 44. The output voltage of the secondary order pressure gradient microphone composed of two first order pressure gradient microphones may be expressed by $$e = 2e_o (D/\lambda) \pi$$

wherein
 $e$: A combined output voltage (volt)
 $e_o$: The output voltage (volt) of the individual microphones
 D: The distance between the two microphones (cm)
 $\lambda$: A wave length (cm)

It is apparent for from the formula that when the wave length $\lambda$ is constant, the output of a secondary order pressure gradient microphone is almost proportional to the distance between the two microphones. Therefore, as the distance increases, the output increases with a reduction in the directional characteristic. Therefore, if the operation of the electrical circuit diagram shown in FIG. 4c is such that, as the zoom lens adjustment approaches the telephoto setting, the distance between the microphones 33, 34 is decreased, an increased directional characteristic will result. According to this invention either the potentiometer interlocking with the zoom ring or that interlocking with the output shaft of the motor M may be controlled, to effect such adjustment.

As will be seen from the foregoing description, the present invention is directed to an electrical and mechanical control of the directional characteristic of a microphone or microphone arrangement in accordance with the adjustment of the focal length of an associated camera, and has accomplished its objective by the use of a simple mechanism as is evident from the embodiments. The variable directional microphones according to the invention are not limited by the illustrations, and all other types of microphones may be employed. The present invention is applicable to both systems in the simultaneous sound and picture recording system, that is, a single system in which the film and tape are combined as a unit to record picture and sound on the same medium, and a double system in which picture and sound are recorded independently on different media, and further is applicable to video tape recorder systems.

What is claimed is:

1. A system for varying the directional characteristic of a sound-receiving microphone arrangement in accordance with the adjustment of the focal length of an associated camera, comprising in combination,
    a sound-receiving microphone arrangement provided with a directional characteristic variable means capable of varying its directional characteristic in response to a directional characteristic variable signal input from outside,
    a means for generating an electrical signal corresponding to the zoom lens adjustment over the entire zooming region arranged in interlocking relationship with a zoom lens control means provided in the camera, and
    a control means for controlling the variation of the directional characteristic of the microphone arrangement connected both to said signal generating means and to said microphone arrangement, said control means having a means for detecting the output signal from said signal generating means, and a means for generating a directional characteristic variable signal which directs the detected output of said detecting means to the input of said directional characteristic variable means, so that the directional characteristic of the microphone arrangement can be varied in accordance with the zoom lens adjustment of the camera.

2. The system as described in claim 1 wherein said sound-receiving microphone arrangement further includes a condenser microphone having a variable directional characteristic.

3. The system as described in claim 1 wherein said sound-receiving microphone arrangement includes a ribbon microphone having openings through which the velocity component may pass on.

4. The system as described in claim 1 wherein said means for generating an electrical signal corresponding to the zoom lens adjustment further includes a variable resistor arranged in interlocking relationship with the zoom lens control means.

5. The system as described in claim 1 wherein said control means further includes a circuit for providing a signal for comparison with the output of said detecting means so that the directional characteristic of the microphone arrangement is varied from omnidirectional to unidirectional while adjusting the zoom lens from the wide angle setting to the telephoto setting.

6. The system as described in claim 1 wherein said directional characteristic variable signal generating means of said control means for controlling the variation of the directional characteristic of the microphone arrangement further includes a bridge circuit containing said means for generating an electrical signal corresponding to the zoom lens adjustment as one arm and a resistor for giving information for the directional characteristic variation as another arm.

7. A system for varying the directional characteristic of a sound-receiving microphone device in accordance with the adjustment of the focal length of an associated camera comprising in combination,
    a microphone device having a directional characteristic, said device having openings through which the velocity component may pass on, and means for varying the areas of the openings,
    a zoom lens control means for moving axially the zoom lens assembly provided in the camera to effect the adjustment of the focal length,
    a means for giving an information corresponding to the zoom lens adjustment over the entire zooming region arranged in interlocking relationship with said zoom lens control means, and
    a control means for operatively connecting said information giving means with said means for varying the areas of the openings of the microphone device, said means detecting the information from said information giving means and permitting said opening area variable means to be driven in response to said information, so that the directional characteristic of said microphone device can be varied in accordance with the zoom lens adjustment of the camera.

8. A system for varying the directional characteristic of a sound-receiving microphone in accordance with the adjustment of the focal length of an associated camera comprising in combination,
    a microphone having a directional characteristic variable means capable of varying the directional characteristic from the omnidirectional to unidirectional ones,
    a zoom lens control means for moving axially the zoom lens assembly provided in the camera to effect the adjustment of the focal length, a means for giving an information corresponding to the zoom lens adjustment over the entire zooming region arranged in interlocking relationship with said zoom lens control means, and
    a directional characteristic control means for operatively connecting said information giving means with said directional characteristic variable means of the microphone, said means having a control circuit for detecting the information introduced from said information giving means and generating an operation signal directing to said directional characteristic variable means in such a manner that while the zoom lens is adjusted from the wide angle setting to the telephoto setting, the directional characteristic of said microphone is varied from omnidirectional to unidirectional.

9. A system for varying the directional characteristic of a sound-receiving microphone in accordance with the adjustment of the focal length of an associated camera comprising in combination,
a sound-receiving device composed of two microphones having cardioid unidirectional characteristics arranged in series and connected with each other in opposite phases,
an adjusting means for varying the relative distance between the two microphones connected in series in order to vary the directional characteristic of said sound-receiving device,
a zoom lens control means for moving axially the zoom lens assembly provided in the camera to effect the adjustment of the focal length,
a means for giving an information corresponding to the zoom lens adjustment over the entire zoom region arranged in interlocking relationship with said zoom lens control means, and
a directional characteristic control means inserted between said information giving means and said adjusting means, said means detecting the information from said information giving means and transmitting the information capable of driving said adjusting device in such a manner that while said zoom lens is adjusted from the wide angle setting to the telephoto setting, the relative distance between the two microphones is decreased by the said adjusting means.

10. A combination of a motion picture camera for continuous picture recording and a recording device for simultaneous sound recording containing
a motion picture camera having a zoom lens and a zoom lens control means for moving axially the zoom lens assembly of said zoom lens,
a means for giving an information corresponding to the zoom lens adjustment arranged in interlocking relationship with said zoom lens control means,
a microphone device having a directional characteristic variable in response to the information from said information giving means, said device being provided with a directional characteristic giving means connected with said information giving means to detect the information from said information giving means so that said means gives a resultant directional characteristic to the output of said microphone, and
a sound-recording device connected to the output of said microphone, said device recording the output signals of said microphone.

* * * * *